(12) United States Patent
Yoo et al.

(10) Patent No.: US 10,046,596 B2
(45) Date of Patent: Aug. 14, 2018

(54) IMAGE BOARD FOR ROTARY WHEEL AND ROTARY WHEEL INCLUDING SAME

(71) Applicants: Chung Sup Yoo, Incheon (KR); Yoon Hwa Kim, Incheon (KR); In Sung Oh, Incheon (KR); Sung Sug Ryu, Incheon (KR); Sung Hun Kim, Incheon (KR)

(72) Inventors: Chung Sup Yoo, Incheon (KR); Yoon Hwa Kim, Incheon (KR); In Sung Oh, Incheon (KR); Sung Sug Ryu, Incheon (KR); Sung Hun Kim, Incheon (KR)

(73) Assignee: MIRYOON W&T CORPORATION, Seoul (KR)

( * ) Notice: Subject to any disclaimer, the term of this patent is extended or adjusted under 35 U.S.C. 154(b) by 112 days.

(21) Appl. No.: 15/304,405

(22) PCT Filed: Mar. 30, 2015

(86) PCT No.: PCT/KR2015/003094
§ 371 (c)(1),
(2) Date: Oct. 14, 2016

(87) PCT Pub. No.: WO2015/160111
PCT Pub. Date: Oct. 22, 2015

(65) Prior Publication Data
US 2017/0043615 A1 Feb. 16, 2017

(30) Foreign Application Priority Data

Apr. 14, 2014 (KR) .................. 10-2014-0044227
Mar. 16, 2015 (KR) .................. 10-2015-0035796

(51) Int. Cl.
*B60B 7/00* (2006.01)
*B60B 7/20* (2006.01)
*B60B 7/06* (2006.01)

(52) U.S. Cl.
CPC .............. *B60B 7/0053* (2013.01); *B60B 7/20* (2013.01); *B60B 7/004* (2013.01); *B60B 7/066* (2013.01)

(58) Field of Classification Search
CPC ......... B60B 7/0053; B60B 7/20; B60B 7/004; B60B 7/066
(Continued)

(56) References Cited

U.S. PATENT DOCUMENTS 4,280,293 A * 7/1981 Kovalenko .............. B60B 7/20
301/37.25
2012/0319459 A1* 12/2012 Salah ...................... B60B 7/04
301/37.25
(Continued)

FOREIGN PATENT DOCUMENTS

JP 2001354001 12/2001
KR 1020020047469 6/2002
(Continued)

*Primary Examiner* — S. Joseph Morano
*Assistant Examiner* — Jean W Charleston
(74) *Attorney, Agent, or Firm* — Rabin & Berdo, P.C.

(57) ABSTRACT

An image board for a rotary wheel which is mounted on a rotary wheel of a vehicle and displays a stationary image regardless of the rotation of the rotary wheel, the image board including: a base plate which is uprightly arranged on the outer portion or the inside of a wheel frame provided on the rotary wheel and mounted to be independently rotatable with respect to the wheel frame, and on one side or both sides of which a predetermined image is arranged, the base plate including a chamber on which a space is formed to be extended along the circumferential direction with respect to a rotational axis; a main weight which is fixedly mounted on the bottom of the base plate and applies a load to the bottom of the base plate; and a compensation weight which moves within the space as the main weight rotates in any direction and applies a load to the main weight so that the main weight (Continued)

returns to the original position thereof, the compensation weight being arranged within the space.

17 Claims, 12 Drawing Sheets

(58) Field of Classification Search
USPC ...... 301/37.24, 37.25, 37.26, 37.108, 37.109
See application file for complete search history.

(56) References Cited

U.S. PATENT DOCUMENTS

| 2013/0175850 A1* | 7/2013 | Ryu | ............................ | B60B 7/20 |
| | | | | 301/37.25 |
| 2015/0170558 A1* | 6/2015 | Salah | ..................... | G09F 21/045 |
| | | | | 301/5.22 |

FOREIGN PATENT DOCUMENTS

| KR | 1020040107907 | 12/2004 |
| KR | 100767600 | 10/2007 |
| KR | 1020110004621 | 1/2011 |
| KR | 101147057 | 5/2012 |
| KR | 20130047922 A | * 5/2013 |
| KR | 1020130047922 | 5/2013 |

* cited by examiner

"Related Art"

IMAGE BOARD FOR ROTARY WHEEL AND ROTARY WHEEL INCLUDING SAME

BACKGROUND OF THE INVENTION

Field of the Invention

The present invention relates to an image board for a rotary wheel and a rotary wheel including the same, and more particularly, to an image board for a rotary wheel that is mounted on a rotary wheel of a vehicle such as a car or a bicycle and displays an image at a fixed position regardless of rotation of the rotary wheel, and a rotary wheel including the image board.

Description of Related Art

FIGS. 1 to 2 illustrate the configuration of an image board 10 for a rotary wheel in the related art. Referring to FIG. 1, the image board 10 of the related art is vertically mounted on a wheel frame 20 of a vehicle 1 to be rotatable through a bearing (not shown). Further, the image board 10 has a weight 11 for predetermined load at a lower portion and various images I such as a logo, an emblem, or and advertising image on the outer side.

Accordingly, even though the wheel frame 20 is rotated while the vehicle 1 runs, the weight 11 keeps the position without rotating by the load of the weight 11 and the image I is displayed at a fixed position, so the image board 10 can provide an advertising effect and a decorative effect as an accessory.

However, while the bearing is rotated such that a wheel frame 20 and the image board 10 are rotated relative to each other, friction is generated on bearing balls inside the bearing. Further, while the vehicle 1 runs, driving wind generates friction on the image board 10 exposed to the outside, so torque F1 is generated in the image board 10, as illustrated in FIG. 2. Accordingly, the image board 10 that is not rotated when the vehicle 1 runs at a low speed is rotated with the wheel frame 20 when the vehicle 1 runs at a high speed.

Further, when the vehicle 1 that is running stops, inertia for forward movement is generated in the weight 11, so the image board 10 is rotated in the opposite direction to the wheel frame 210.

Further, since the weight 11 is eccentrically disposed at the lower portion of the image board 10, when the weight 11 is rotated with the image board 10 due to malfunction of the bearing, vibration is generated by an eccentric weight change of the weight 11, in which the heavier the weight 11, the more the vibration increases, and it adversely influences the steering function of the vehicle 1.

SUMMARY OF THE INVENTION

The present invention has been made in an effort to solve the problems and an object of the present invention is to provide an image board for a rotary wheel that can always display a still image by applying load to return a main weight disposed at a lower portion of a base plate to the original position using a compensating weight even if the main weight is rotated with the base plate that is rotated by friction on bearing balls, driving wind, and inertia force, and a rotary wheel including the image board.

According to an aspect of the present invention, an image board for a rotary wheel, which is mounted on a rotary wheel of a vehicle and displays an image at a fixed position regardless of rotation of the rotary wheel, includes: a base plate that is vertically disposed on the outer side of or inside a wheel frame of the rotary wheel to be rotatable independently from the wheel frame, has a predetermined image on one or both sides, and has a chamber having a space circumferentially extending around a rotational axis; a main weight that is fixed at a lower potion of the base plate and applies load to the lower portion of the base plate; and a compensating weight that is disposed in the space and applies load to return the main weight to an original position by moving in the space when the main weight rotates in a predetermined direction.

The main weight may be an impeller that is rotated in the opposite direction to the wheel frame by driving wind that comes when the vehicle runs.

The compensating weight may be fluid that is injected in the space by a predetermined amount and applies load to the base plate by moving to be leveled by its weight when the main weight rotates.

The image board may further include an expansion plate that is vertically disposed, is larger in diameter than the base plate, is mounted on a side or around the edge of the base plate, and has a predetermined image on one or both sides.

According to another aspect of the present invention, a rotary wheel that is mounted at a lower portion of a vehicle, moves the vehicle by rotating, and displays an image at a fixed position, includes: a wheel frame that is fitted in a tire and rotated by power; and an image board that includes a base plate that is vertically disposed on the outer side of or inside the wheel frame of the rotary wheel to be rotatable independently from the wheel frame, has a predetermined image on one or both sides, and has a chamber having a space circumferentially extending around a rotational axis, a main weight that is fixed at a lower potion of the base plate and applies load to the lower portion of the base plate, and a compensating weight that is disposed in the space and applies load to return the main weight to an original position by moving in the space when the main weight rotates in a predetermined direction.

According to the present invention, the following effects can be achieved.

First, even if the base plate is rotated and the main weight at the lower portion is accordingly rotated by friction between bearing balls generated while the vehicle runs and inertia generated by driving wind or stop of the vehicle, the compensating weight in the chamber of the base plate applies load to return the main weight to the original position by moving in the space of the chamber, so it is possible to display an image at a fixed position.

Second, when an impeller that is rotated in the opposite direction to the wheel frame by driving wind that comes when the vehicle runs is used as the main weight, the faster the wheel frame rotates, the larger the rotational speed of the impeller and the larger the inertia force and the friction force generated by the impeller, so it is possible to minimize the torque of the base plate at a high speed.

Third, when fluid injected in the space by a predetermined amount is used as the compensating weight, the weight can apply load by instantaneously moving to be leveled in the space when the main weight is rotated, so it is possible to maximize the response speed for applying load to return the main weight to the original position.

Fourth, since the expansion plate having a predetermined image on the outer side is vertically disposed on a side or around the edge of the base plate, it is possible to make the base plate thin and it is also possible to largely increase the area where an image can be disposed in accordance with the diameter of the wheel frame.

Further, since the expansion plate can be separated from the base plate, a user can freely change the image. Further-more, when the base plate is vertically disposed inside the wheel frame, it is possible to fit the expansion plate inside the spokes of the wheel frame through the slit formed at a predetermined position on the expansion plate, so convenience for the user is improved and the expansion plate can be easily replaced.

These and other features and advantages of the invention will become apparent to those skilled in the art from the following description and the accompanying drawing. It should be understood, however, that the detailed description and specific examples, while indicating a preferred embodiment of the present invention, are given by way of illustration and not of limitation. Many changes and modifications may be made within the scope of the present invention without departing from the spirit thereof, and the invention includes all such modifications.

DETAILED DESCRIPTION OF THE PREFERRED EMBODIMENTS

Figure 1:
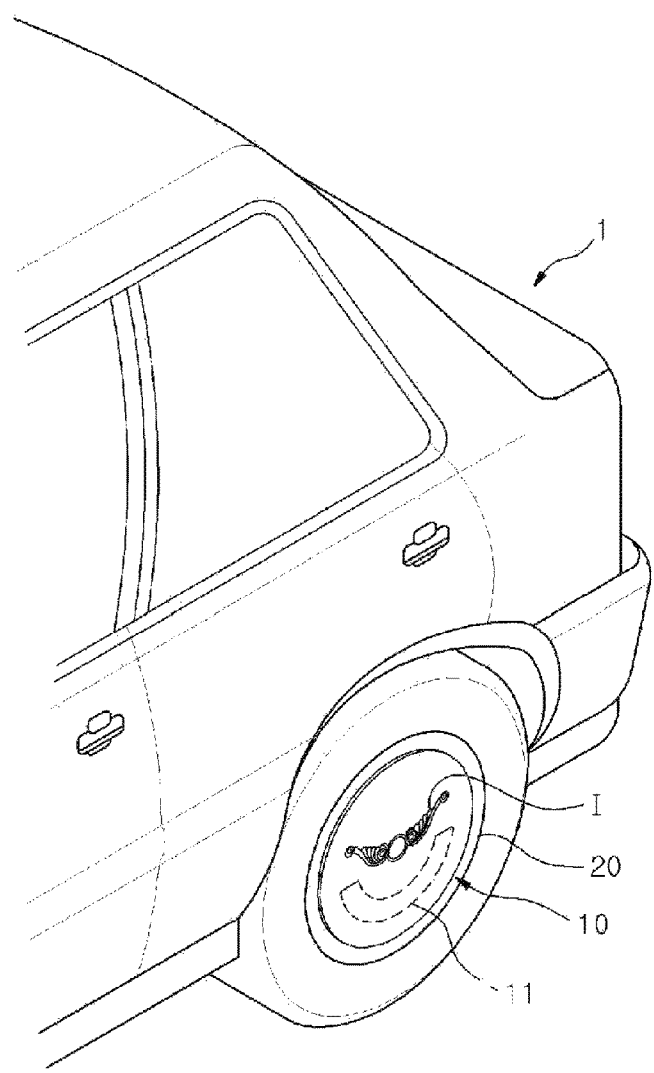
FIGS. 1 and 2 are a perspective view and a side view, respectively, illustrating the configuration and the operational principle of an image board for a rotary wheel in the related art.
Figure 2:
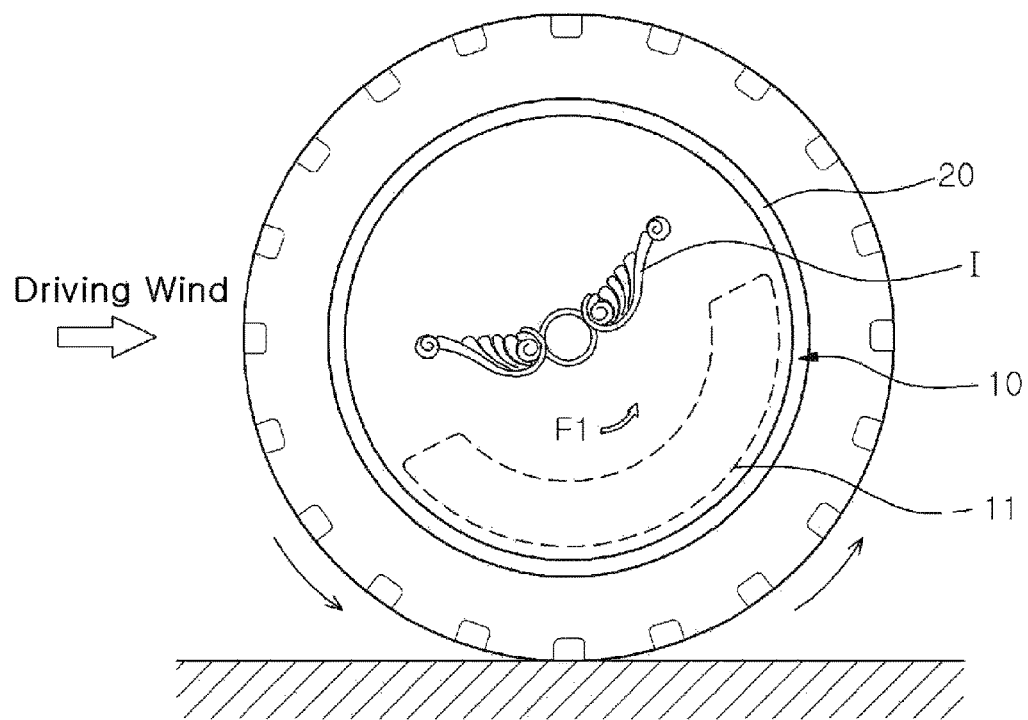

The objects, features, and advantages of the present invention described above will be made clear by the following detailed description. Hereinafter, preferred embodiments of the present invention are described in detail with reference to the accompanying drawings.

A rotary wheel 200 according to a preferred embodiment of the present invention, which is a rotary wheel mounted at a lower portion of a vehicle 1 such as a car or a bicycle and displaying an image I at a fixed position while moving the vehicle (1) by rotating, includes a wheel frame 210 and an image board 100.

Figure 5:
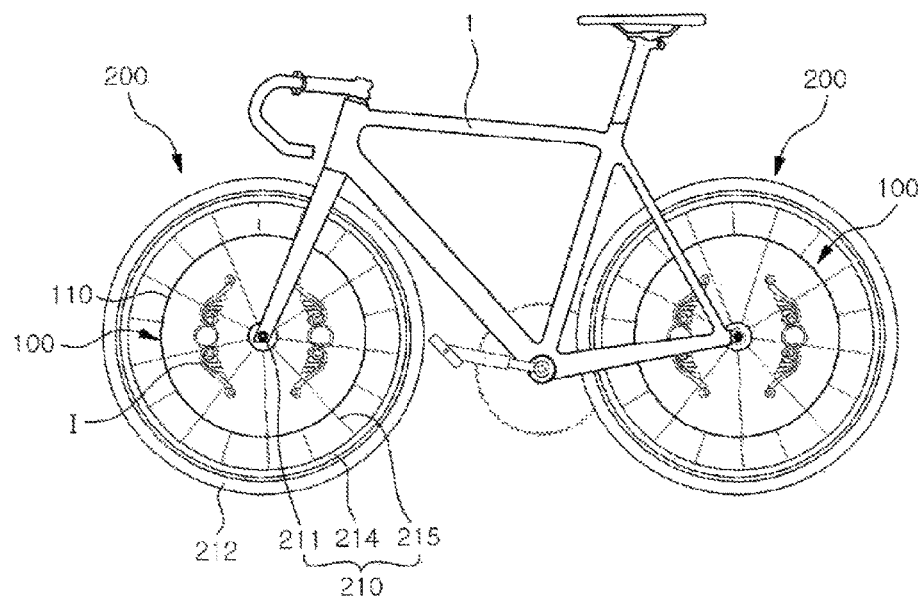
FIGS. 5 and 6 are side views illustrating a configuration in which the image board for a rotary wheel according to a preferred embodiment of the present invention is mounted on various vehicles.
Figure 6:
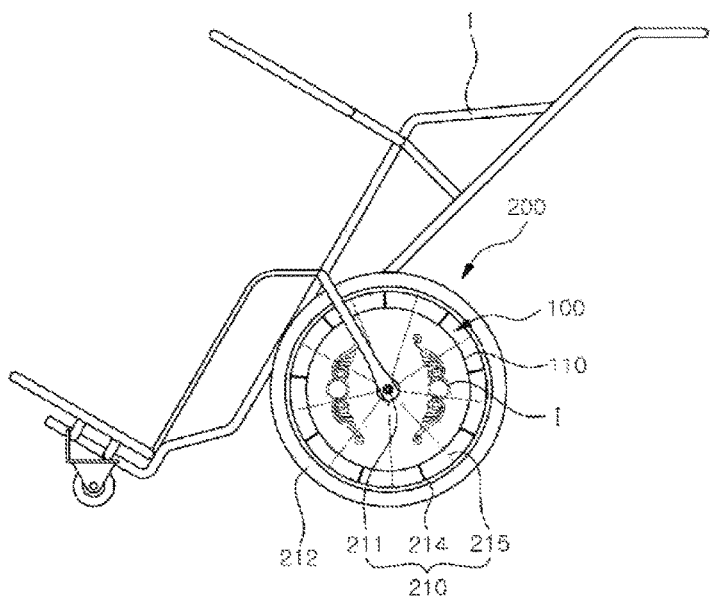

Herein, the vehicle 1 can be moved by the rotary wheel 200 and the rotary wheel 200 is a moving device having the wheel frame 210 on which the image board 100 can be mounted. As illustrated in FIGS. 1, 5, and 6, the vehicle 1 includes all of not only a car, bicycle, and a cart, but also other vehicles equipped with the rotary wheel 200 having the wheel frame 210 such as a motor cycle, a golf cart, a wheelchair, and a baby walker.

The wheel frame 210, which is a wheel member to be fitted in a tire 212 and rotated by power, is mounted with the image board 100 that can independently rotate, may be formed in an integrated type such as the wheel frames for cars, depending on the type of the vehicle 1, and may be fitted on a driving shaft to be rotatable. Alternatively, the wheel frame 210, similar to those of a bicycle, may include a rim 214 that is fitted in a tire 212, a rotary shaft 211 that is disposed at the center of the rim 214 and rotated by torque from a chain or an engine, and a plurality of spokes 215 that connects the rotary shaft 211 and the rim 214 to each other to support load.

The image board 100, a part independently rotatably mounted on the wheel frame 210 and displaying an image I at a fixed position regardless of rotation of the wheel frame 210, as illustrated in FIGS. 3 to 9, includes a base plate 110, a main weight 120, and a compensating weight 130.

The base plate 110, which is a disc-shaped member forming the body of the image board 100, is vertically disposed on the outer side of or inside the wheel frame 210 of the rotary wheel 200 to be rotatable independently from the wheel frame 210.

Further, the base plate 110 has a predetermined image I on a side or both sides and has a chamber 112 providing a space 111 circumferentially extending around a rotational axis L.

Herein, the base plate 110 may be coupled to a bearing 150 and vertically disposed on the outer side of or inside the wheel frame 210 such that it can rotate independently from the wheel frame 210 through the bearing 150.

The image I, which includes various design images such as a logo, an emblem, or an advertising image, may be intactly printed on the base plate 110 as it is, a sheet printed with the image I may be attached to the base plate 110, a specific image plate printed with the image I may be mounted on the base plate 110, or a symbol having a specific shape may be mounted on the base plate 110.

Further, when the image I is not exposed (illustrated) on the inner side connected to the driving shaft like the wheel frame 210 of a car, but is exposed to the outside on the outer side, it is disposed on the outer side of the base plate 110. Further, when the image I is exposed to the outside on both sides through the spoke 215 like the wheel frame 210 of a bicycle, it is preferable to dispose the image on both sides of the base plate 110, thereby increasing the effect of exposing the image.

Further, the chamber 112, which provides a space and a passage for moving the compensating weight 130, has a ring-shaped space 111 that is disposed at a side or at the center of the base plate 110 and rotated about the rotational axis L of the base plate 110.

Although the disc-shaped base plate 110 is exemplified in the drawings, the present invention is not limited thereto and the entire shape is not limited, including an ellipse, a triangle, a rectangle, and a polygon etc. However, it is preferable that the chamber 112 has an entirely circular shape such as an O-shape or a C-shape.

Figure 3:
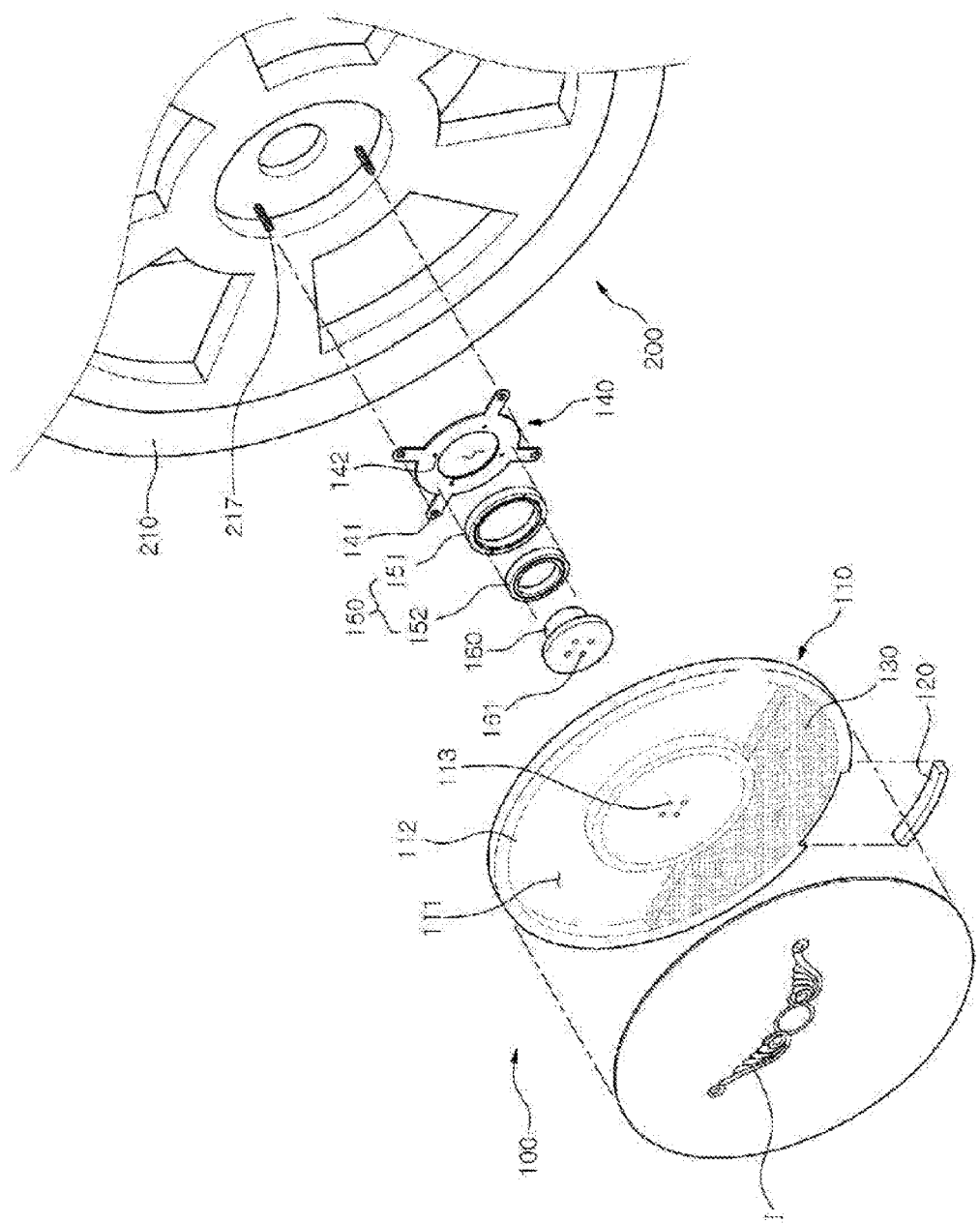
FIGS. 3 and 4 are an exploded perspective view and a lateral cross-sectional view, respectively, illustrating a configuration in which an image board for a rotary wheel according to a preferred embodiment of the present invention is mounted on the outer side of a wheel frame.
Figure 4:
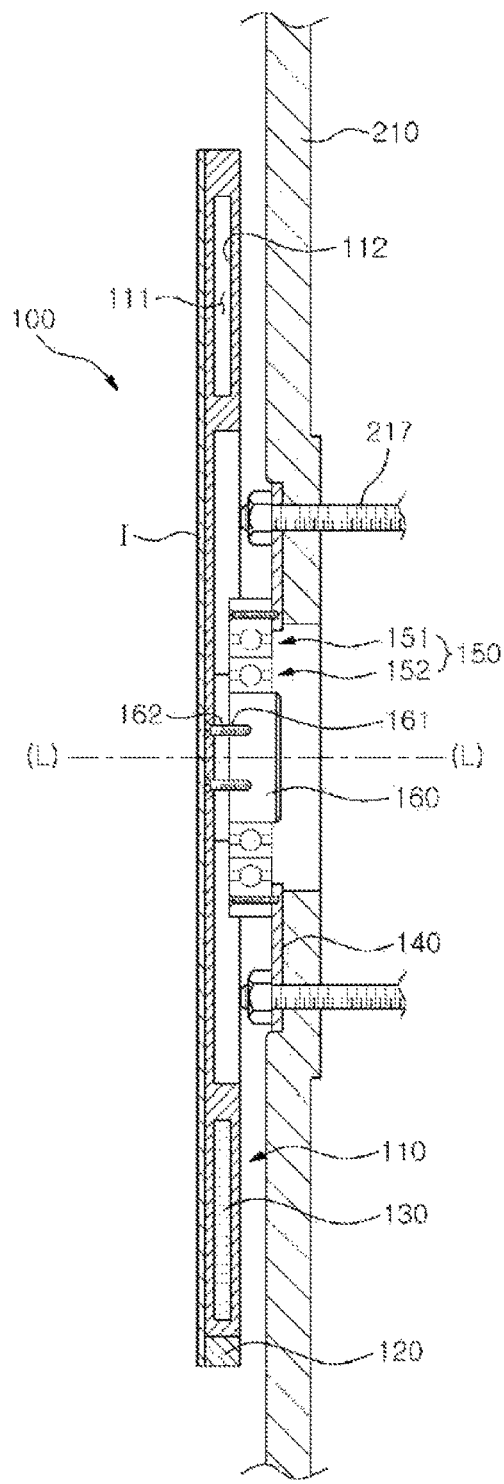

Further, as illustrated in FIGS. 3 and 4, when the wheel frame 210 is exposed to the outside on the outer side, the image board 100 is rotatably mounted on the outer side of the wheel frame 210, and to this end, a coupling plate 140, a bearing 150, and a fixing shaft 160 are further included.

In more detail, the coupling plate 140, which is a plate vertically coupled to a side of the wheel frame 210 to support the image board 100 so that the image board 100 is rotatably mounted on the wheel frame 210, is formed in a plate shape and has a plurality of fastening holes 141 around it for inserting screws 217 protruding from the wheel frame 210 and a fastening hole 142 at the center for coupling the bearing 150.

Further, the bearing 150, which is coupled to the center of the coupling plate 140 to physically isolate the image board 100 from rotation of the wheel frame 210, is fixed to the center of the coupling plate 140 around the outer side and is fitted on the fixing shaft 160.

Herein, the bearing 150 is composed of a plurality of individual bearings 151 and 152 having different inner diameters and sequentially fitted in larger ones, so torque F1 (see FIG. 11) that rotates the image board 100 can be reduced by friction and inertia force generated by rotation of the individual bearings 151 and 152.

The fixing shaft 160, which is fitted in the center of the bearing 150 between the bearing 150 and the base plate 110 and is rotatably coupled to the coupling plate 140 through the bearing 150, as illustrated in FIG. 3, has a first end fitted in the bearing 150 and a second end coupled to the center of the base plate 110.

Further, fastening holes 160 for thread-fastening are formed at the second end of the fixing shaft 160, so, as illustrated in FIG. 4, the fixing shaft 160 can be firmly fastened inside the base plate 110 by screws 162 that are tightened in fastening holes 113 formed through the base plate 110 at positions corresponding to the fastening holes 161.

Figure 7:
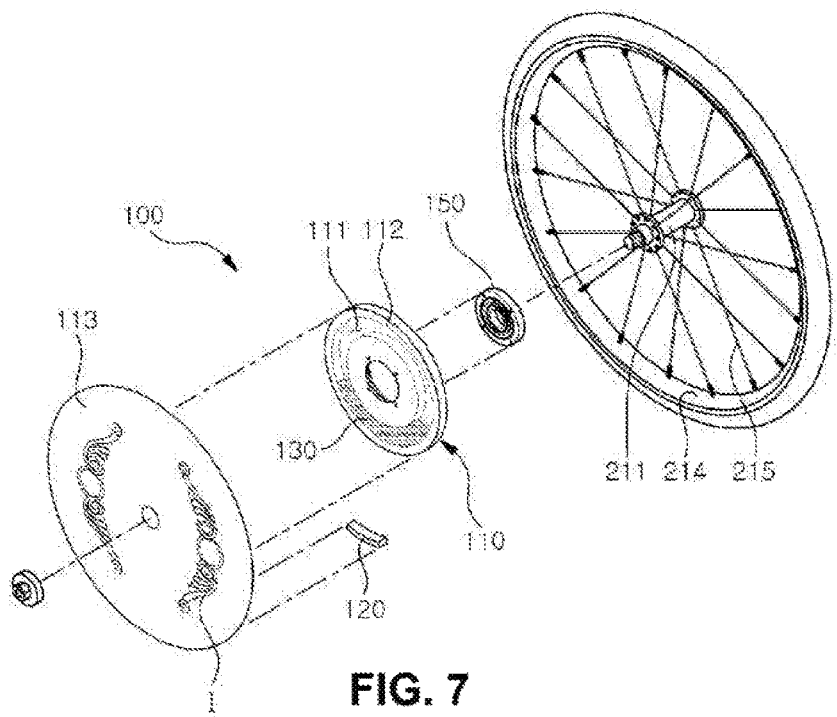
FIG. 7 is an exploded perspective view illustrating another configuration for mounting an image board for a rotary wheel according to a preferred embodiment of the present invention on the outer side of a wheel frame.
Figure 8:
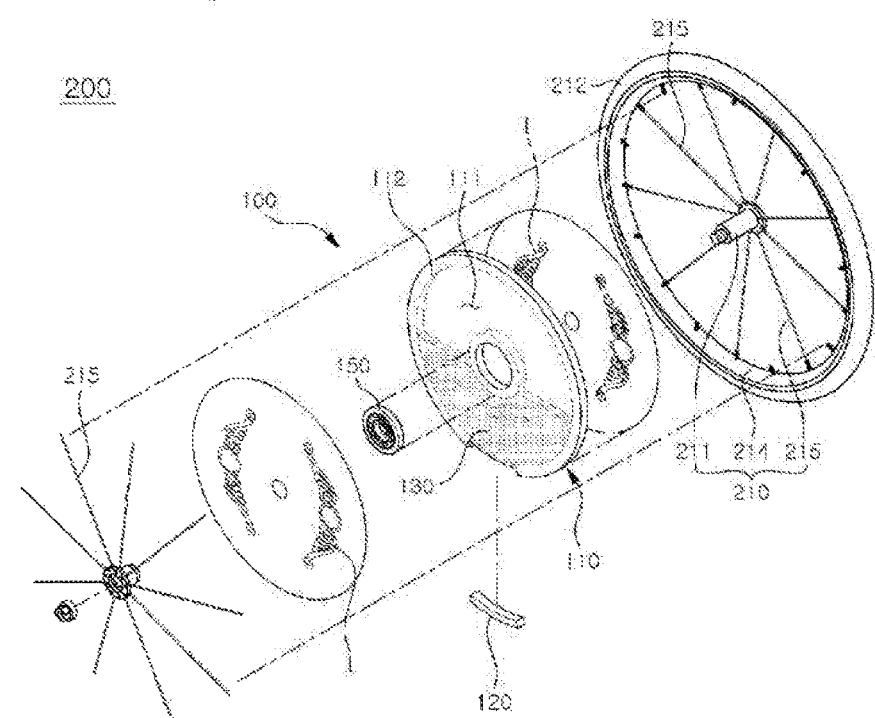
FIGS. 8 and 9 are an exploded perspective view and a lateral cross-sectional view, respectively, illustrating a configuration in which an image board for a rotary wheel according to a preferred embodiment of the present invention is mounted inside a wheel frame.
Figure 9:
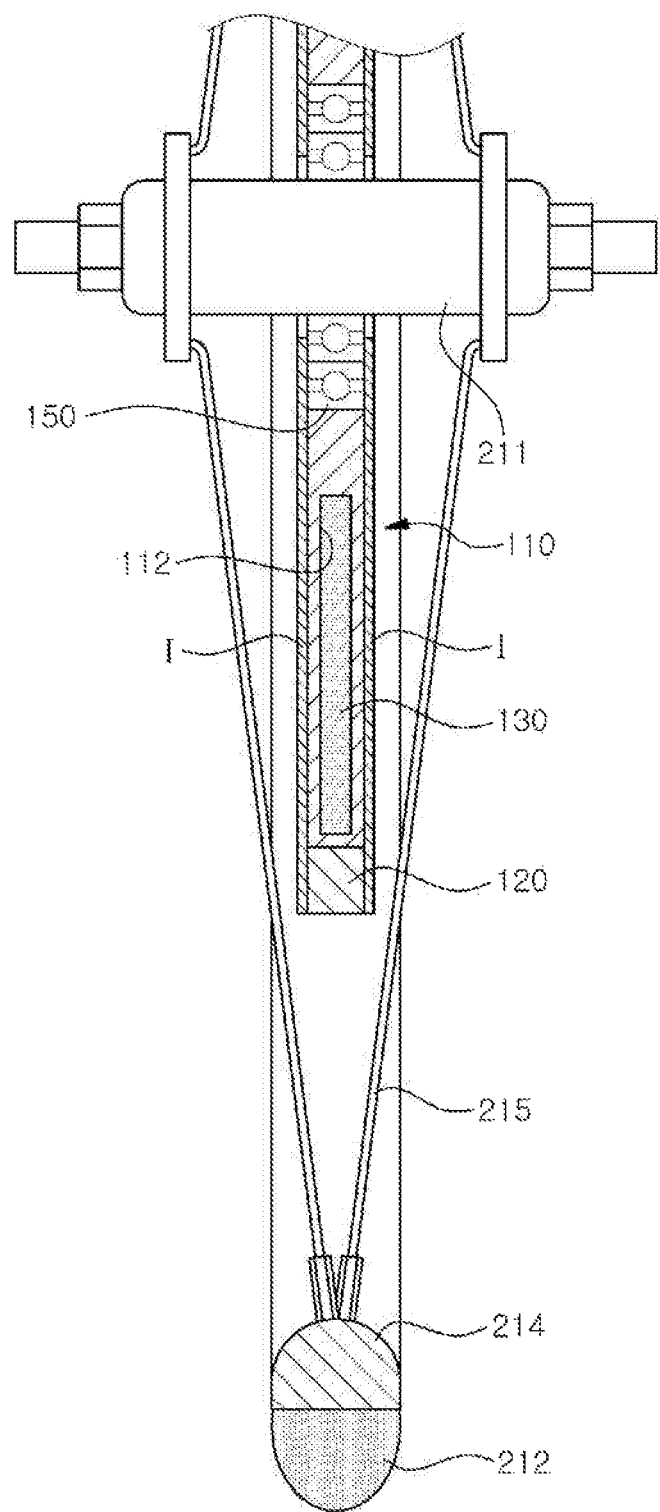

On the other hand, when both sides of the wheel frame 210 are exposed through the spoke 215 such as bicycle, a motor cycle, a golf cart, a wheelchair, and a cart, as illustrated in FIG. 7, the image board 100 may be mounted on the outer side of the wheel frame 210, but, as illustrated in FIGS. 8 and 9, the image board 100 may be rotatably mounted inside the wheel frame 210.

In more detail, as illustrated in FIG. 7, the bearing 150 is fitted on a rotary shaft 211 of the wheel frame 210 and the bearing 150 is fitted in the center of the base plate 110, whereby the image board 100 can be vertically mounted on the outer side of the wheel frame 210 to be independently rotatable.

In this configuration, as in the type of fastening an image board to the wheel frame 210 of a car, a specific coupling plate (not illustrated) may be provided to more strongly fit the bearing 150 on the rotary shaft 211 or more strongly fit the bearing 150 in the base plate 110.

Further, as illustrated in FIGS. 8 and 9, the base plate 110 may be vertically disposed inside the wheel frame 210, whereby the image board 100 can be protected from the outside by the spoke 215 without protruding to the outside and the external appearance can be improved.

To this end, the bearing 150 may be laterally fitted on the horizontal rotary shaft 211 of the wheel frame 210 by the hole therein and the base plate 110 may be fitted on the bearing 150 and vertically disposed inside the wheel frame 210 such that it can be rotated independently from the wheel frame 210 by the bearing 150.

The main weight 120, which is a part applying load to the lower portion of the base plate 110 so that the image I on the image board 100 can be displayed always at a fixed position even though the wheel frame 210 is rotated, as illustrated in FIGS. 3 and 4, is fixed at an eccentric lower portion on the base plate 110 with the image I vertically disposed to be displayed to the outside and applies load to the lower portion of the base plate 110.

Herein, although the main weight 120 is exemplified as a smooth curved bar in the drawings, the present invention is not limited thereto and the shape is not limited as long as it can minimize friction with external air while applying load to the lower portion of the base plate 110 such as a disc or a sphere.

Figure 10:
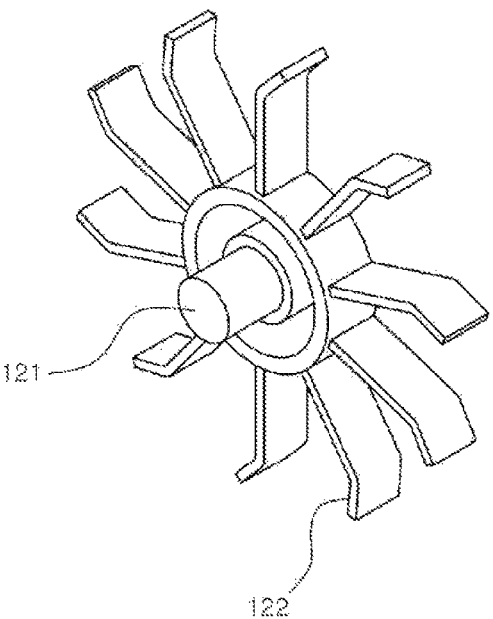
FIG. 10 is a perspective view illustrating a configuration in which a main weight according to a preferred embodiment of the present invention is formed in the shape of an impeller.
Figure 11:
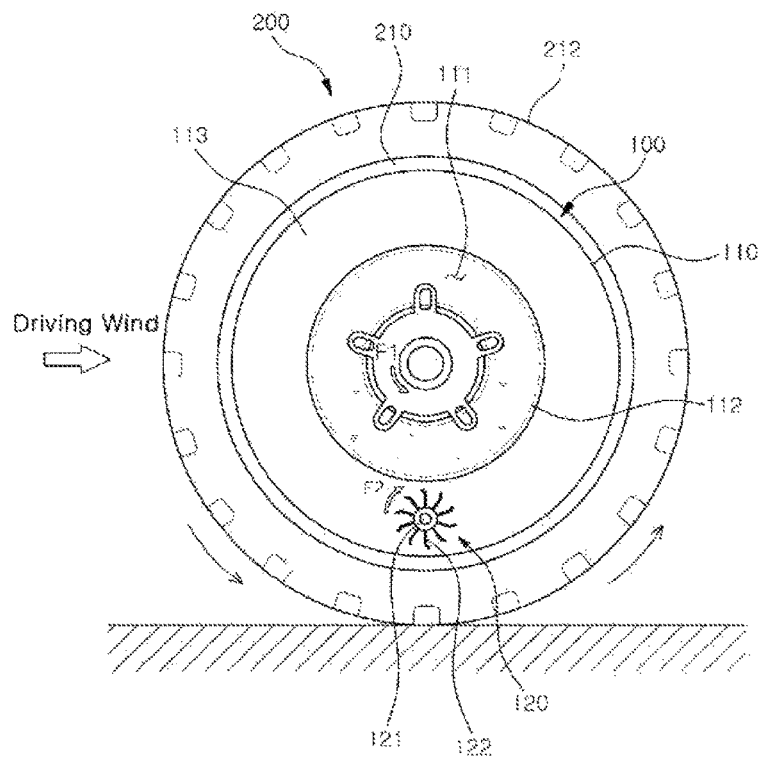
FIG. 11 is a side view illustrating the operational principle of the main weight having the shape of an impeller according to a preferred embodiment of the present invention.

Further, as illustrated in FIGS. 10 and 11, the main weight 120 may be an impeller 120 that is rotated in the opposite direction to the wheel frame 210 by driving wind that comes when the vehicle 1 runs.

The impeller 120 generates torque F2 (see FIG. 11) in the opposite direction to offset the torque F1 generated by rotation of the wheel frame 210 to display the image I always at a fixed position on the base plate 110 even though the wheel frame 210 is rotated at a high speed.

In more detail, an end of a rotary shaft 121 of the impeller 120 is fixed to the lower portion of the base plate 110 and a plurality of blades 122 that is curved or inclined to be rotated in the opposite direction to the wheel frame 210 by the driving wind from the front is arranged around the rotary shaft 121. Accordingly, as the blades 122 are rotated about the rotary shaft 121 by driving wind, the torque F2 is generated.

As described above, since the impeller 120 that is rotated in the opposite direction to the wheel frame 210 by driving wind that comes when the vehicle 1 runs is mounted at the lower portion of the base plate 110, the torque F1 generated by the wheel frame 210 rotating when the vehicle 1 runs is offset by inertial force F2 generated by rotation of the impeller 120 and friction force F2 on the blades 122, whereby it is possible to display the image I at a fixed position regardless of the rotation of the wheel frame 210. Herein, the inertia force F2 generated in the opposite direction to the rotational direction of the wheel frame 210 when the blades 122 are rotated is caused by a gyro phenomenon.

On the other hand, the image board may further include an expansion plate 113 that is relatively larger in diameter than the base plate 110, is vertically disposed on a side or around the edge of the base plate 110, and has a predetermined image I on one or both sides.

In more detail, as illustrated in FIG. 7, the expansion plate 113 is a large-diameter disc covering a side of the base plate 110 and, may be fastened to the base plate 110 at the center of the inner side and may have the image I on the outer side.

Figure 12:
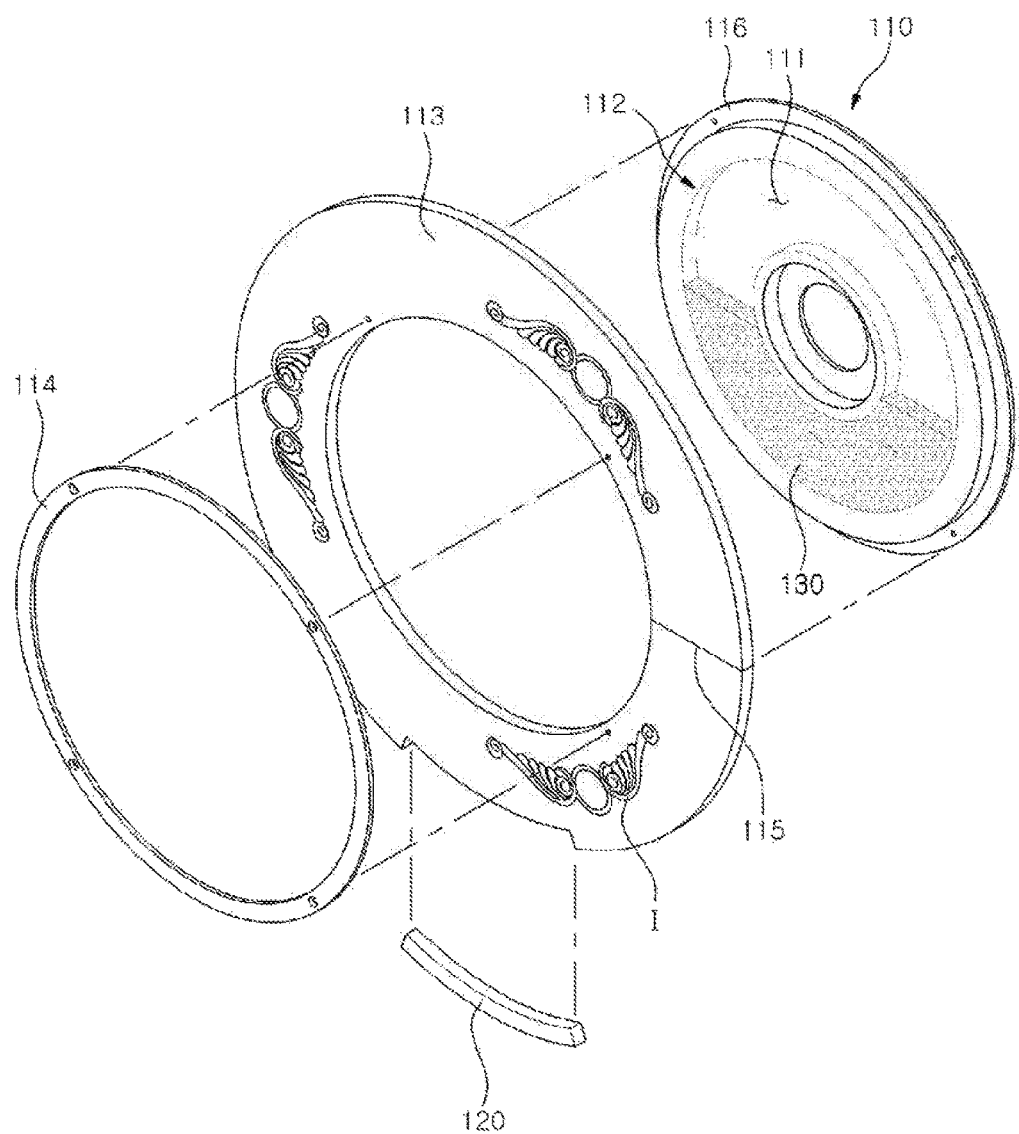
FIGS. 12 and 13 are an exploded perspective view, a lateral cross-sectional view, and a perspective view illustrating the configuration of an expansion plate according to a preferred embodiment of the present invention.
Figure 13:
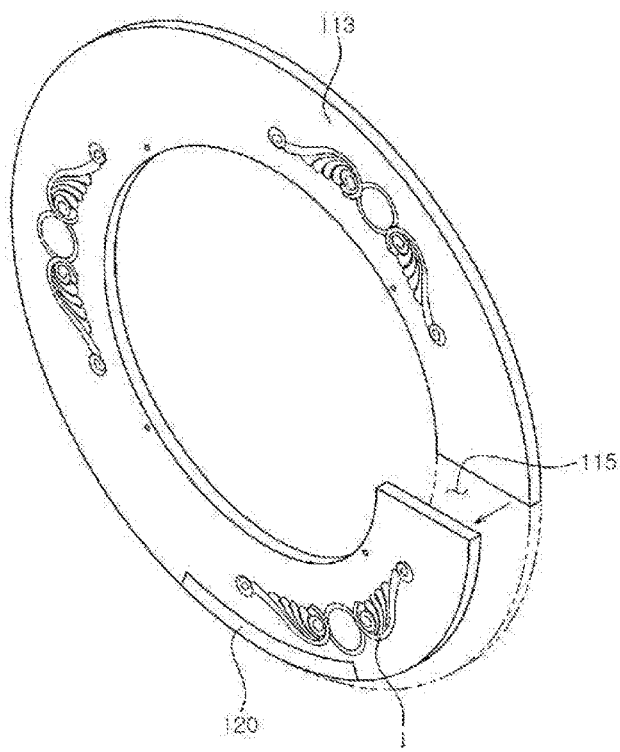

Further, as illustrated in FIGS. 12 and 13, the expansion plate 113 may be formed in a ring shape to be fitted around the base plate 110 and may have an image I, which relates to or is independent from the image on the base plate 110, on the outer side. Herein, as illustrated in the figures, a step 116 for supporting a side around the inner edge of the expansion plate 113 is formed around the edge of the base plate 110 and the expansion plate 113 is thread-fastened firmly to the base plate 110 with the side around the inner edge supported on the step 116 and the other side around the inner edge pressed by a fastening ring.

Herein, as illustrated in FIG. 12, when the expansion plate 113 is mounted on the base plate 110, the main weight 120 applying load to the lower portion may be mounted at an eccentric lower portion of the expansion plate 113. Accordingly, the main weight 120 is further spaced from the rotational axis L as compared with the main weight disposed at a lower portion of the chamber 112, the torque F2 generated in the base plate 110 is increased.

Further, when the expansion plate 113 is formed in a ring shape and fitted around the base plate, as illustrated in FIG. 13, it is preferable that the expansion plate 113 is made of a flexible material and has a slit 115 formed in the width direction at a predetermined position so that it can be fitted inside the spokes 215 through the slit 115 to be detachably coupled to the base plate 110.

The compensating weight 130 is disposed in the space 111 and, applies load to return the main weight 120 to the original position by moving in the space 111 when the main weight 120 is rotated in any directions together with the base plate 110.

Herein, as illustrated in FIGS. 3 and 4, the compensating weight 130 may be fluid 130 that is injected in the space 111 by a predetermined amount to apply load to the base plate 110 so that the main weight 120 can return to the original position, by moving to be leveled by its load when the main weight 120 is rotated.

Figure 14:
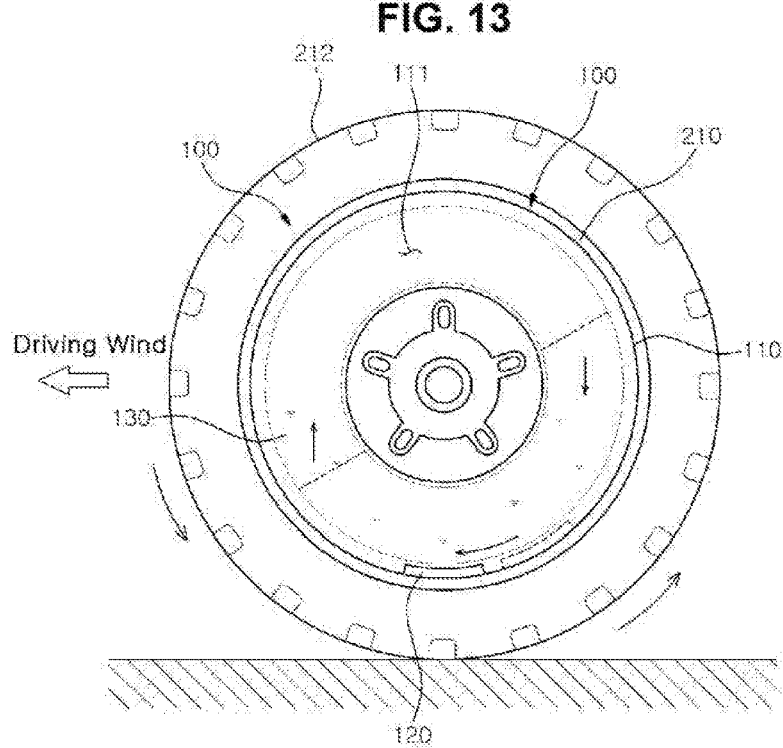
FIGS. 14 and 15 are side views illustrating the operational principle of a compensating weight according to a preferred embodiment of the present invention.
Figure 15:
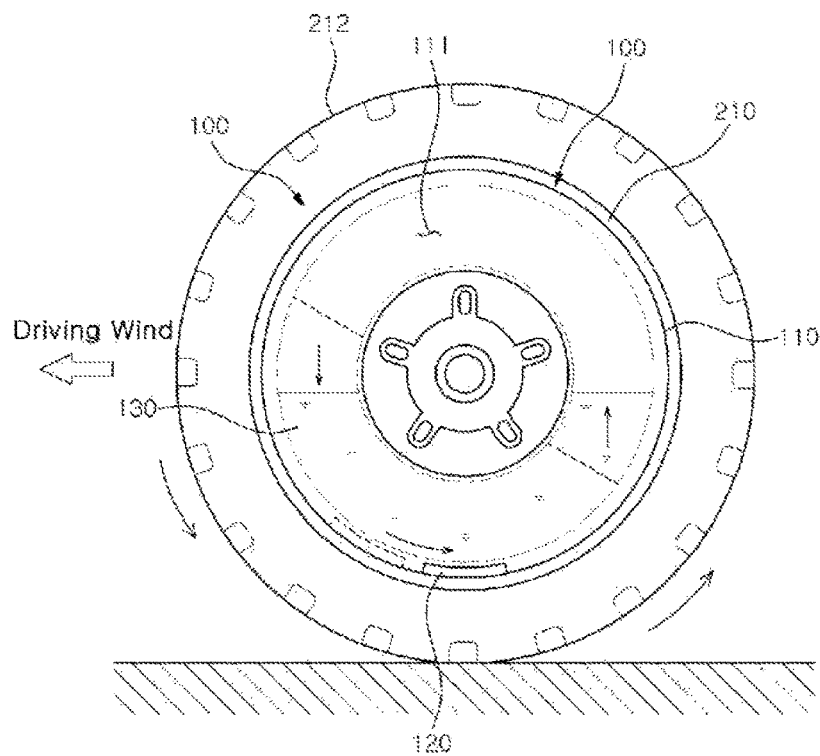

Accordingly, as illustrated in FIG. 14, when the main weight 120 is rotated clockwise with rotation of the base plate 110, the right part of the fluid 130 moves down and the left part moves up in the space 111, so the load of the fluid 130 acts down to the base plate 110, whereby the main weight 120 returns counterclockwise to the original position and accordingly the image I on the base plate 110 can keep the position.

On the contrary, when the main weight 120 is rotated counterclockwise, the left part of the fluid 130 moves down and the right part moves up in the space 111, so the weight of the fluid 130 acts down to the base plate 110, whereby the main weight 120 returns clockwise to the original position and accordingly the image I on the base plate 110 can keep the position.

Further, using antifreezing liquid having a low freezing temperature relative to common liquid such as water makes it possible to normally operate the image board 100 without the fluid 130 freezing in a coldest season such as winter or in an intensively cold area such as Russia.

As described above, when the fluid 130 injected by a predetermined amount in the space 111 of the chamber 112 is used as the compensating weight 130, the liquid instantaneously moves to be leveled in the space 111 when the main weight 120 rotates, so it is possible to maximize the response speed for applying load to return the main weight 120 to the original position.

Figure 16:
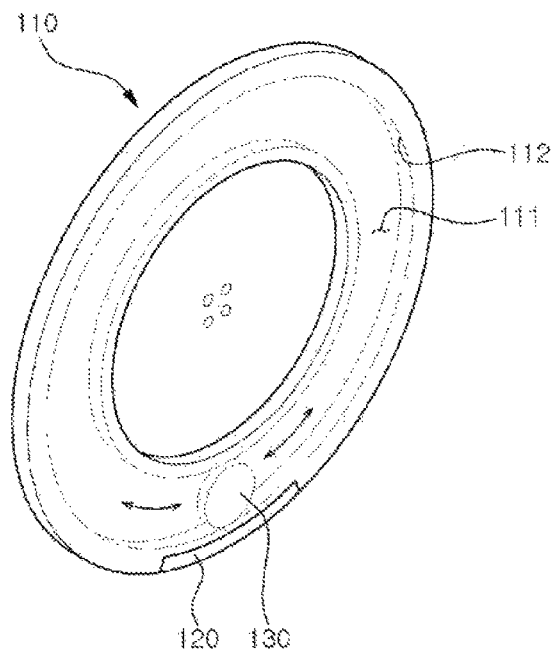
FIGS. 16 and 17 are perspective views illustrating the operational principle of a disc and a spherical compensating weight according to a preferred embodiment of the present invention.
Figure 17:
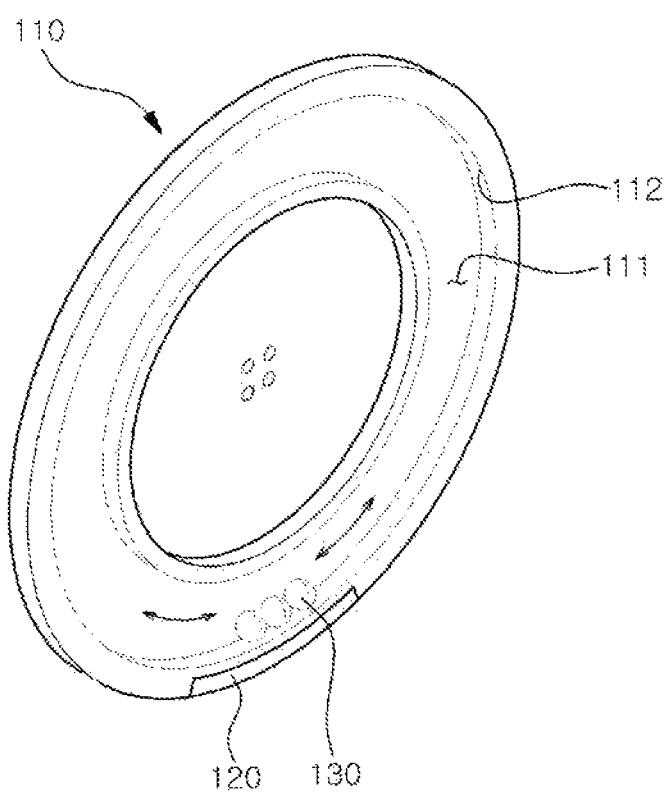

On the other hand, as illustrated in FIGS. 16 and 17, the compensating weight 130 may be a disc or a sphere to apply load to a wheel cover 140 so that the main weight 120 returns to the original position, by rolling on the inner side of the space 111 to move down in the space 111 when the main weight 120 rotates.

Further, it may be possible to adjust the size of the disc or the sphere or it may be possible to provide a plurality of compensating weights in the space 111, depending on the magnitude of the load for returning the main weight 120 to the original position.

It will be apparent to those skilled in the art that the foregoing present invention is not limited by the foregoing embodiments and the accompanying drawings, and various modifications and changes may be made without departing from the scope and spirit of the invention.

The invention claimed is:

1. An image board configured to be mounted on a rotary wheel of a vehicle and to display an image at a stationary position regardless of rotation of the rotary wheel, the image board comprising:
   a base plate disposed on an outer side or an inner side of a rim of the rotary wheel in a rotatable manner independently from the rim, having a predetermined image on at least one side thereof, and including a chamber having a space circumferentially extending around a rotational axis;
   a first weight configured to be arranged at a lower portion of the base plate and to apply a load to the lower portion of the base plate; and
   a second weight configured to be arranged in the space, wherein the first weight includes an impeller configured to rotate in an opposite direction to a rotation direction of the rotary wheel by a driving wind power generated when the vehicle runs.

2. The image board according to claim 1, wherein the second weight includes fluid.

3. The image board according to claim 2, wherein the fluid includes water or antifreeze.

4. The image board according to claim 1, wherein the second weight includes at least one disc member or at least one sphere member.

5. The image board according to claim 1, further comprising an expansion plate formed in a plate shape having a size larger than that of the base plate, arranged on a side or around an edge of the base plate, and having a predetermined image on at least one side.

6. The image board according to claim 5, wherein
   the expansion plate is formed in a disc shape covering the base plate,
   a center portion of a first side of the expansion plate is coupled to the base plate, and
   a second side of the expansion plate has the predetermined image.

7. The image board according to claim 5, wherein
   the expansion plate is formed in a ring shape with an inner circumference thereof mounted on an outer circumference of the base plate, and
   the predetermined image on the expansion plate is related to or independent from the predetermined image on the base plate.

8. The image board according to claim 7, wherein the expansion plate includes a slit formed in a width direction at a predetermined position thereof.

9. A rotary wheel, comprising the image board according to claim 1.

10. A vehicle, comprising the rotary wheel according to claim 9.

11. An image board configured to be mounted on a rotary wheel of a vehicle and to display an image at a stationary position regardless of rotation of the rotary wheel, the image board comprising:
   a base plate disposed on an outer side or an inner side of a rim of the rotary wheel in a rotatable manner independently from the rim, having a predetermined image on at least one side thereof, and including a chamber having a space circumferentially extending around a rotational axis;

an expansion plate formed in a plate shape having a diameter larger than that of the base plate, arranged on a side or around an edge of the base plate, and having a predetermined image on at least one side;

a first weight configured to be arranged at a lower portion of the expansion plate and to apply a load to the lower portion of the base plate; and a second weight configured to be arranged in the space, wherein the first weight includes an impeller configured to rotate in an opposite direction to a rotation direction of the rotary wheel by a driving wind power generated when the vehicle runs.

12. The image board according to claim 11, wherein the second weight includes fluid.

13. The image board according to claim 12, wherein the fluid includes water or antifreeze.

14. The image board according to claim 11, wherein the second weight includes at least one disc member or at least one sphere member.

15. The image board according to claim 11, wherein
the expansion plate is formed in a disc shape covering the base plate,
a center portion of a first side of the expansion plate is coupled to the base plate, and
a second side of the expansion plate has the predetermined image.

16. The image board according to claim 11, wherein
the expansion plate is formed in a ring shape with an inner circumference thereof mounted on an outer circumference of the base plate, and
the predetermined image on the expansion plate is related to or independent from the predetermined image on the base plate.

17. The image board according to claim 16, wherein the expansion plate includes a slit formed in a width direction at a predetermined position thereof.

* * * * *